United States Patent
Yngesjö et al.

(10) Patent No.: US 11,600,042 B2
(45) Date of Patent: Mar. 7, 2023

(54) METHOD FOR 3D RECONSTRUCTION FROM SATELLITE IMAGERY

(71) Applicant: Maxar International Sweden AB, Linköping (SE)

(72) Inventors: Tim Yngesjö, Linköping (SE); Carl Sundelius, Linköping (SE); Anton Nordmark, Linköping (SE)

(73) Assignee: Maxar International Sweden AB, Linköping (SE)

( * ) Notice: Subject to any disclaimer, the term of this patent is extended or adjusted under 35 U.S.C. 154(b) by 0 days.

(21) Appl. No.: 17/410,300

(22) Filed: Aug. 24, 2021

(65) Prior Publication Data
US 2022/0392156 A1     Dec. 8, 2022

(30) Foreign Application Priority Data
Jun. 8, 2021   (EP) ..................... 21178195

(51) Int. Cl.
*G06T 17/05*   (2011.01)
*G06T 7/55*    (2017.01)

(52) U.S. Cl.
CPC ............ *G06T 17/05* (2013.01); *G06T 7/55* (2017.01); *G06T 2200/08* (2013.01); *G06T 2207/10028* (2013.01); *G06T 2207/10032* (2013.01); *G06T 2207/20081* (2013.01); *G06T 2207/20084* (2013.01)

(58) Field of Classification Search
None
See application file for complete search history.

(56) References Cited

FOREIGN PATENT DOCUMENTS

| EP | 3796252 A1 | 3/2021 |
|----|------------|--------|
| WO | WO 2014/112908 A1 | 7/2014 |
| WO | WO 2014/112911 A1 | 7/2014 |

OTHER PUBLICATIONS

European Patent Office, Extended European Search Report received for Application No. 21178195.0, dated Dec. 6, 2021, 9 pages, Germany.

Marí, Roger, et al., "To Bundle Adjust or Not: A Comparison of Relative Geolocation Correction Strategies for Satellite Multi-View Stereo", Proceedings of 2019 IEEE/CVF International Conference on Computer Vision Workshop (ICCVW), Oct. 27, 2019, pp. 2188-2196, IEEE, South Korea.

Treible, Wayne, et al., "Learning Dense Stereo Matching for Digital Surface Models from Satellite Imagery", arxiv.org, Nov. 8, 2018, Cornell University Library, retrieved from the Internet at <URL:https://arxiv.org/pdf/1811.03535v1.pdf> on Dec. 8, 2021, 9 pages.

(Continued)

*Primary Examiner* — Frank S Chen
(74) *Attorney, Agent, or Firm* — Alston & Bird LLP

(57) ABSTRACT

The present disclosure relates to a method for 3D reconstruction from satellite imagery using deep learning, said method comprising providing (101) at least two overlapping 2D satellite images, providing (102) imaging device parameters for the at least two overlapping 2D satellite images, providing (103) at least one trained Machine Learning Network, MLN, able to predict depth maps, said trained MLN being trained on a training set comprising multi-view geocoded 3D ground truth data and predicting (104) a depth map of the at provided at least two 2D satellite images using the trained at least one MLN and based on the corresponding imaging device parameters.

21 Claims, 5 Drawing Sheets

(56) References Cited

OTHER PUBLICATIONS

Tripodi, Sebastien, et al., "Operational Pipeline for Large-Scale 3D Reconstruction of Buildings from Satellite Images", Proceedings of 2020 IEEE International Geoscience and Remote Sensing Symposium (IGARSS 2020), Sep. 26, 2020, pp. 445-448, IEEE, Waikoloa, HI.

Zhang, Xiaowei, et al., "Automatic Deep Inference of Procedural Cities from Global-Scale Spatial Data", ACM Transactions on Spatial Algorithms and Systems, Oct. 2020, pp. 1-28, vol. 7, No. 2, retrieved from the Internet at <URL:http://dl.acm.org/doi/pdf/10.1145/3423422> Feb. 2021.

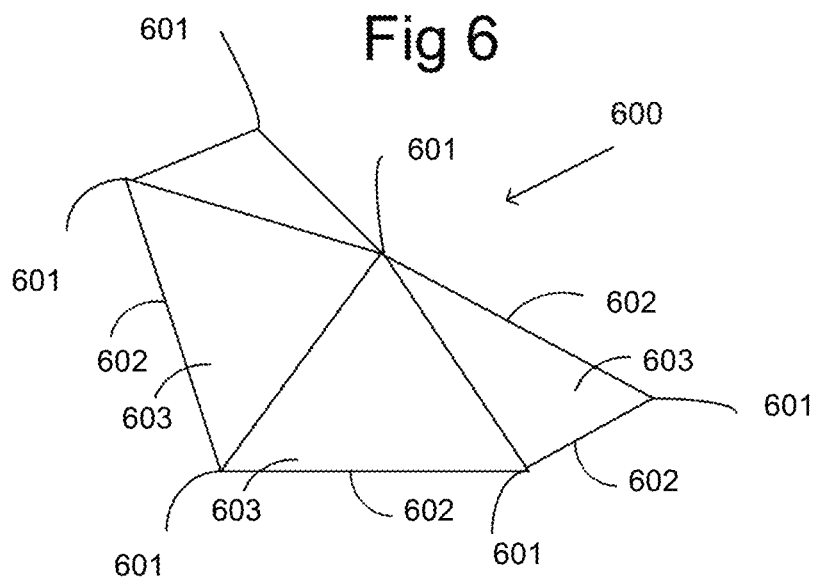
Fig 6
Fig 7
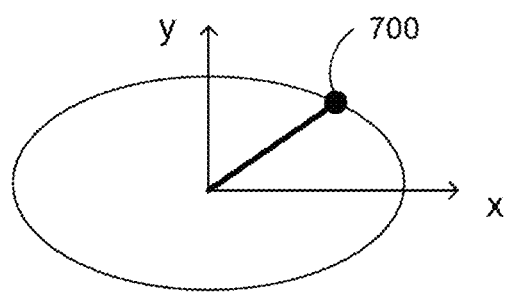
Fig 8
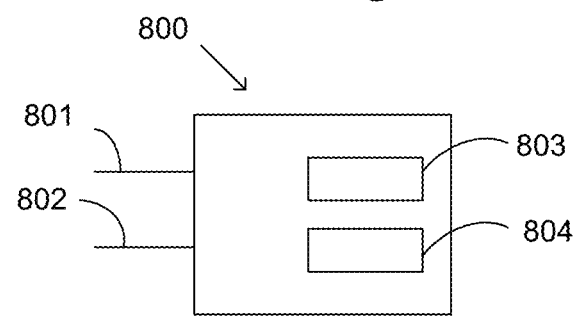

METHOD FOR 3D RECONSTRUCTION FROM SATELLITE IMAGERY

CROSS REFERENCE TO RELATED APPLICATIONS

This application claims priority to and the benefit of European Application No. 21178195.0, filed on Jun. 8, 2021, the entire contents of which as are hereby incorporated by reference.

The present invention relates to a method for 3D reconstruction from satellite imagery using deep learning.

BACKGROUND

Related Field

A fast-growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects. This way of providing digital maps comprises forming two-dimensional maps comprising capturing images of the terrain from an aircraft and post-processing of the captured images. It is possible to form three-dimensional maps from captured images or range data sets of the terrain/infrastructure.

In order to achieve an efficient capturing of images of the ground it is advantageous to use satellite images as satellites may capture images covering a large area in a short time. A drawback with satellite images is that they have lower resolution than aerial images taken from, e.g., an aeroplane. It is however very time consuming and sometimes impossible to capture aerial images covering large areas, one reason being that the ground areas to be captured on images are in a country not allowing aerial image capturing.

BRIEF SUMMARY

An objective of the present invention is to provide a method, a system and a computer program, which enables more efficient and/or accurate 3D reconstruction of large areas, than has been possible according to the prior art.

At least one of these objects is fulfilled with a method, a system and a computer program according to the independent claims.

Further advantages are achieved with the features of the dependent claims.

According to a first aspect of the present invention, a method is provided for 3D reconstruction from satellite imagery using deep learning. The method comprises providing at least two overlapping 2D satellite images; providing imaging device parameters for the at least two 2D satellite images; providing at least one trained Machine Learning Network, MLN, able to predict depth maps, said trained MLN being trained on a training set in which ground truth data comprises multi-view geocoded ground truth data and predicting a depth map of the provided at least two 2D satellite images using the trained at least one MLN and based on the corresponding imaging device parameters.

According to a second aspect of the present invention, a system is provided for 3D reconstruction from satellite imagery using least two 2D satellite images and deep learning.

The advantages of such a system are the same as those described in relation to the first aspect of the invention. Thus, the system enables more efficient and/or accurate 3D reconstruction of large areas.

According to a third aspect of the present invention a computer program for 3D reconstruction from satellite imagery using deep learning, comprising instructions which, when executed by at least one processor cause the at least one processor to carry out the method according to the first aspect or any of the preferred embodiments of the first aspect.

BRIEF DESCRIPTION OF THE FIGURES

In the following description of preferred embodiments, reference will be made to the attached drawings on which

FIG. 6 illustrates an example 3D reconstruction formed as a mesh.

FIG. 7 illustrates an example of a mesh uncertainty.

FIG. 8 is a block scheme illustrating an example of a system for 3D reconstruction from satellite imagery using deep learning.

DETAILED DESCRIPTION OF VARIOUS EMBODIMENTS

Figure 1:
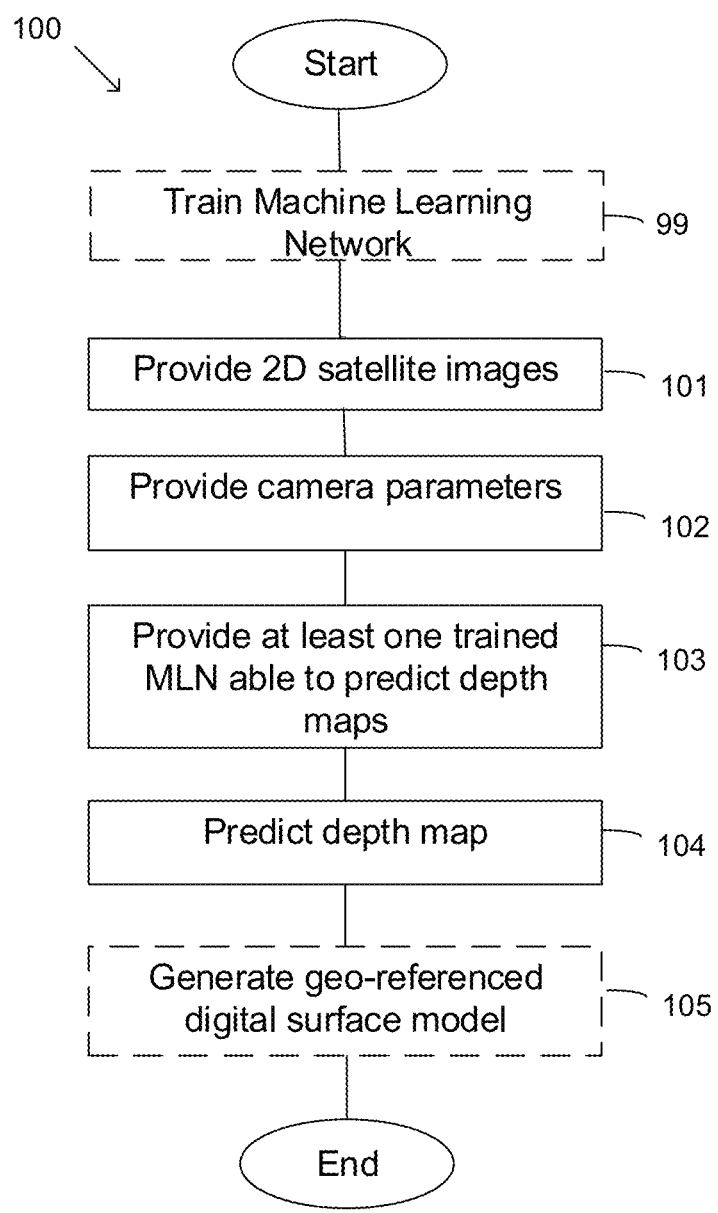
FIG. 1 is a flow chart illustrating an example of a method for 3D reconstruction from satellite imagery using deep learning.

In the following description of preferred embodiments, the same reference numerals will be used for similar features in the different drawings. The drawings are not drawn to scale.

In FIG. 1, a method for 3D reconstruction from satellite or spaceborn imagery using deep learning is illustrated.

The method comprises a step of providing 101 at least two 2D satellite images. The at least two 2D satellite images may comprise images captured within the visible wavelength field, Near Infrared, NIR, and/or thermal images. The images may be panchromatic or multispectral or a combination of all spectral bands.

The images are captured by an imaging device. The at least two satellite images comprise overlapping images.

The overlapping images may be bundle adjusted. Given a set of images depicting a number of 3D points from different viewpoints, bundle adjustment can be defined as the problem of simultaneously refining the 3D coordinates describing the scene geometry as well as the parameters of the relative motion and the optical characteristics of the camera(s) employed to acquire the images, according to an optimality criterion involving the corresponding image projections of all points.

Further, the 2D satellite images are associated to imaging device parameters relating to the time of capture of the respective image. The imaging device parameters comprise extrinsic and/or intrinsic parameters. The imaging device extrinsic parameters comprise for example a 3D position of the imaging device and/or a pointing direction of the imaging device and/or a rotational position of the imaging device.

The imaging device extrinsic parameters are for example represented in a camera model. The camera model is for example a rational polynomial coefficient, RPC, model. The RPC model is a generalized sensor model, which can achieve high approximation accuracy. The RPC model is widely used in the field of photogranimetry and remote sensing. In another example, the camera model is a rigorous sensor model known in the art. These are only examples, there are many ways known in the art for providing extrinsic and/or intrinsic imaging device parameters.

The method comprises further a step of providing 102 at least some of the intrinsic and/or extrinsic imaging device parameters for the at least two 2D satellite images. Examples of instrinsic and/or extrinsic imaging parameters which may be provided are given above, wherein it is explained that the 2D satellite images are associated to imaging device parameters relating to the time of capture of the respective image.

The method further comprises a step of providing 103 at least one trained Machine Learning Network, MLN, able to predict depth maps. The trained MLN has been trained on a training set comprising multi-view 3D geocoded ground truth data. The term "3D geocoded ground truth data" refers to that the ground truth data is geocoded, i.e. comprises a 3-dimensional coordinate.

The data of the training set may have a higher resolution than the resolution of the at least two 2D satellite images.

The multi-view 3D geocoded ground truth data may be rendered from a geocoded 3D surface model provided for training purposes for training of the MLN.

The multi-view 3D geocoded ground truth data may be real world data, in contrast to synthetic data. Alternatively, the ground truth data may comprise both real world data and synthetic data. Alternatively, the ground truth data may be synthetic data.

Accordingly, the multi-view 3D geocoded ground truth data may be rendered from a geocoded 3D surface model provided for training of the MLN and provided based on real world data.

The multi-view 3D geocoded ground truth data may comprise images. The images may be captured from the ground or from the air, such as from an aircraft, drone etc. The images may be captured by an imaging device such as a camera for visual light or by an IR or NIR camera or a camera operating in any other range.

Thus, multi-view 3D geocoded ground truth data may comprise or be rendered from a 3D geocoded 3D surface model provided for training of the MLN and formed based on images.

The generation of a geocoded 3D surface model from 2D images is known from the prior art and is described in, e.g., WO2014/112911. The method described in said publication comprises the steps of providing a plurality of overlapping images of the environment, each image being associated to geo-position data; optionally providing distance information, said distance information comprising a distance value and geo-position data from a plurality of distance measurements; and developing the 3D model based on the plurality of overlapping images and the distance information, if provided.

The step of developing the geocoded 3D surface model used for training the MLN may comprise the steps of providing the geocoded 3D surface model based on the plurality of overlapping images and updating the geocoded 3D surface model with the distance information using an iterative process. There are a few different ways of representing the geocoded 3D surface model. The geocoded 3D surface model may be represented as a mesh, as a surface representation, or as a voxel representation or as a point cloud.

The multi-view 3D geocoded ground truth data may comprise distance measurement data such as LIDAR measurement data and/or radar measurement data and/or sonar measurement data and/or distance measurement data provided using structured light. For example, processing may be performed of a plurality of distance measurements for a plurality of geographically known positions using a distance-determining device, thereby providing a geocoded 3D surface model for use as a training set.

The multi-view ground truth data may relate to a plurality of geographical areas and comprise a plurality of reference images and/or measurement data capturing each geographical area from different angles. The multi-viel ground truth data may have been extracted from a geocoded 3D surface model.

The training set may relate to a built-up environment, such as an urban environment. The built-up environment may be a residential area with low buildings, an area with medium-high buildings or a city center with high buildings. The training set may instead relate to a mountainous landscape. These examples relate to an environment which is substantially constant over time, and which has an elevation profile with steep slopes. However, other terrain types are also possible.

The method further comprises a step of predicting 104 a depth map of the provided at least two 2D satellite images using the trained at least one MLN and based on the corresponding imaging device parameters. The prediction of the depth map may comprise predicting also an uncertainty map relating to the depth map. Thus, the MLN then generates the depth map and the related uncertainty map. The uncertainty map indicates an uncertainty from each value of the depth map. The prediction of the depth map may comprise associating the data of the depth map to geocoded two-dimensional coordinate data.

As is clear from the above the trained MLN may be arranged to predict depth maps for built-up environments and/or mountainous landscapes.

The MLN may comprise a plurality of MLNs and wherein decisions are taken based on voting.

The method may further comprise a step of generating 105 a textured or non-textured geocoded 3D surface model based on the predicted depth map.

The method may further comprise a pre-step of training 99 the at least one MLN.

Figure 2:
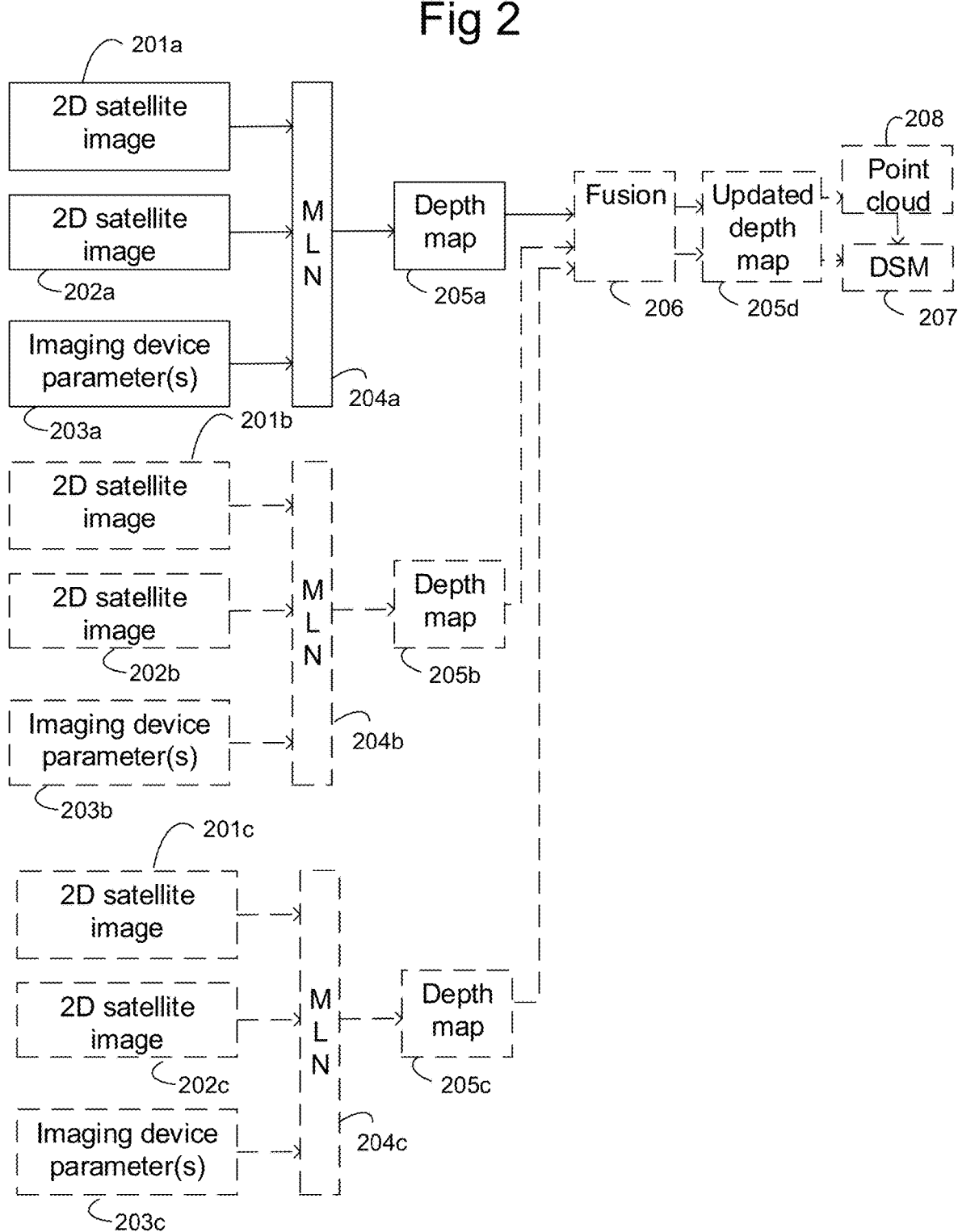
FIG. 2 illustrates schematically examples of processing of a computer program for generation of data for 3D reconstruction from satellite imagery using deep learning.

In FIG. 2, processing of a computer program is illustrated for generation of data for 3D reconstruction from satellite imagery using deep learning according to at least some of the examples of the method as disclosed in relation to FIG. 1.

In FIG. 2, at least two 2D satellite images 201a, 202a are provided to a trained MLN 204a. Also imaging device parameters associated to the respective satellite image 201a, 202a are provided to the trained MLN 204a. The satellite images 201a. 202a and/or imaging device parameters 203a may be stored in a memory (not disclosed) and obtained therefrom for processing by the MLN 204a.

The trained MLN 204a is arranged to predict a depth map 205a of the provided at least two 2D satellite images based on the at least two 2D satellite images with their corresponding imaging device parameters.

In the illustrated example, the trained MLN comprises a plurality of trained MLNs 204a, 204b, 204c. Each MLN is then arranged to each generate a depth map 205a, 205b, 206c. An updated depth map is then formed based on the predicted depth maps. When available, the updated depth map may further be formed based on an uncertainty map relating to the respective depth map. An updated uncertainty map may then be formed accordingly.

A fusion unit/function 206 for data fusion may then be arranged to form the updated depth map 205d to be used to represent the area covered by the at least two 2D satellite images. In one example, one of the depth maps 205a, 205b, 205c is selected to represent the area covered by the at least two 2D satellite images. Alternatively, the depth maps 205a, 205b, 205c generated by the MLNs are combined to provide the depth map 205d to be used to represent the area covered by the at least two 2D satellite images. As mentioned above, in data fusion, one depth map may be selected (so-called voting) or a plurality of depth maps may be combined. The data fusion may utilize an uncertainty map associated to the respective depth map.

There are many methods known in the art for fusion of data sets. Different statistical means can be used such as averaging, wherein outliners may have been removed.

In one example, the trained MLNs are differently trained. The at least two 2D satellite images 201a, 202a; 201b, 202b; 201c, 202c processed by the respective trained MLN may then be the same at least two 2D satellite images for all MLNs. Alternatively, the plurality of trained MLNs may be copies of the same MLN. In accordance with the illustrated example, the MLNs may be fed with different image sets. For example, the first MLN 204a may be provided with a first set of 2D satellite images 201a, 202a, the second MLN 204a may be provided with a second set of 2D satellite images 201b, 202b and the at least one third MLN 204c may be provided with at least one third set of 2D satellite images 201c, 202c.

Further, the predicted depth map 205a provided by the MLN 204 or the updated depth map 205d provided by data fusion may be further processed.

There exists many ways of representing the geometry of a scene. A Digital Surface Model, DSM, is a type of 3D data used to describe the elevation of the Earth's surface. In a DSM, both artificial and natural features are captured. Artificial features include objects such as houses and bridges, and natural features include vegetation. A DSM can be represented using a grid of equally sized squares, commonly known as a raster. A DSM may also be represented using a triangular irregular network as a mesh.

A point cloud is an unordered set of points in 3D space representing an object or scene. It is common associating each point with extra data depending on the application, e.g. a colour value for visualization. In order to speed up processing, it is common to partition the point cloud into uniform voxels or into an octree.

Thus, the depth map 205a, 205d may be used for generating a geocoded 3D surface model 207. The geocoded 3D surface model 207 may be generated directly from the depth map 205a, 205d. The depth map 205a, 205d may be used to generate a point cloud 208. A geocoded 3D surface model 207 may then be obtained based on the point cloud.

Figure 3:
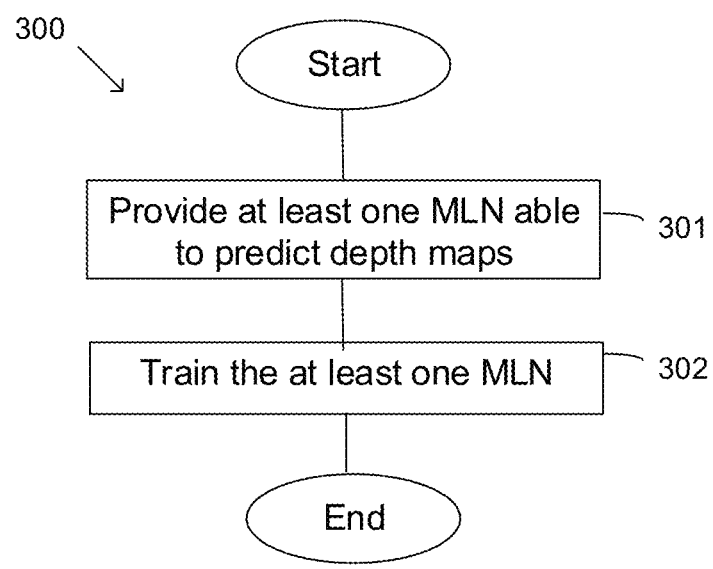
FIG. 3 is a flow chart illustrating an example of a method for training a Machine Learning Network, MLN, for 3D reconstruction from satellite imagery.
Figure 4:
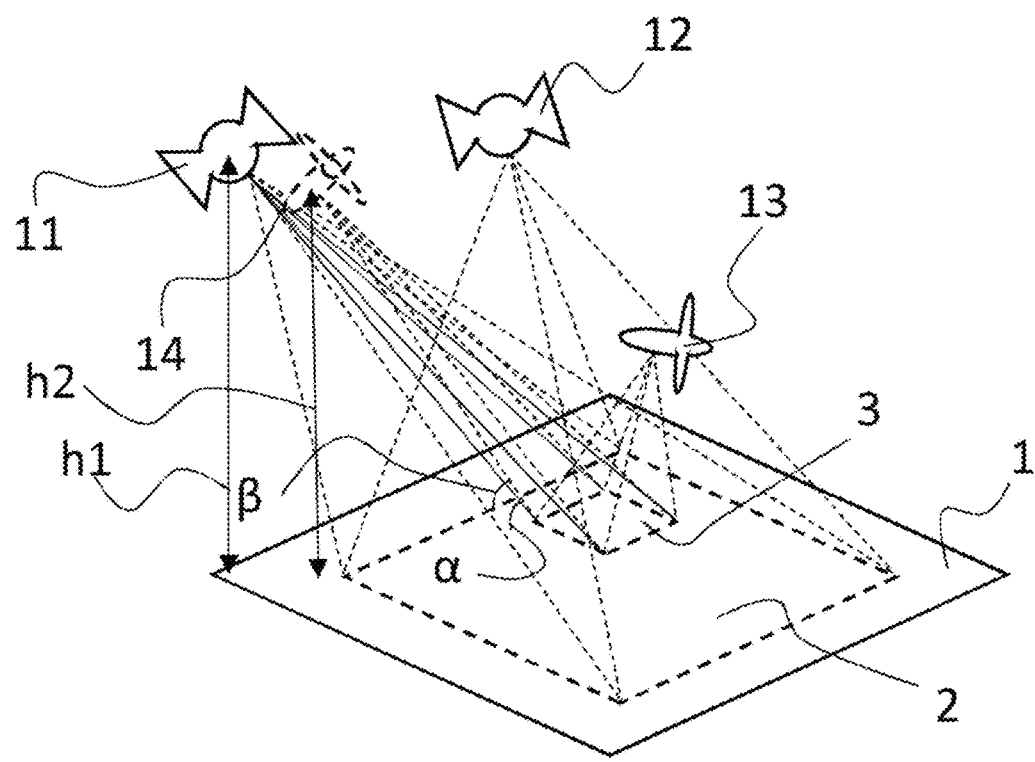
FIG. 4 shows schematically an illustrating example of data used for generation of data for 3D reconstruction from satellite images.

FIG. 4 shows schematically an illustrating example of data used for generation of data for 3D reconstruction from satellite images. In the illustrated example, images of an area on the ground 1 are captured using a first satellite 10 and a second satellite 11. Further, images have been taken using an aircraft 12. As us shown in FIG. 3 the first satellite 10 captures a first two-dimensional (2D) satellite image of a first area 2 from a first angle and the second satellite 11 captures a second two-dimensional (2D) satellite image of the first area 2 from a second angle.

Also shown in FIG. 4 is an aircraft and yet another satellite, which capture images of a second geographical area 3 from different angles. Those images of the second geographical area may be used for training the MLN. Preferably, the data used for training the MLN has a higher resolution than the images captured of the first area 2. Preferably, the images captured from different angles of the second geographical area are geocoded. Those images captured from different angles may have been used in advance for forming a geocoded 3D surface model for training purposes and then data may be extracted from this geocoded 3D surface model to provide multi-view 3D geocoded ground truth data. Alternatively those images captured from different images are directly used for providing multi-view 3D geocoded ground truth data for use in the training.

In the illustrated example, due to the smaller distance between the aircraft and the ground 1 compared to the distance between the satellites 11, 12, and the ground 1, it is possible to achieve a higher resolution on the images captured from the aircraft 13 than on the images captured from the satellites.

In FIG. 4 the second geographical area 3 is within the first area 2. However, the second geographical area 3 may be situated at another location than within the first area 2.

However, this is only an example. For example, data obtained in other ways may form the training set. The data for the training set may be extracted from a geocoded 3D surface model provided for training the MLN and based on real world data. The data for the training set may comprise images and/or LIDAR measurement data and/or radar measurement data and/or sonar measurement data. The only thing that is important is that the training set comprises multi-view ground truth data. The training set may have been extracted from a geocoded 3D surface model. The training set may relate to a plurality of geographical areas and comprise a plurality of reference images and/or measurement data capturing each geographical area from different angles.

In FIG. 3, a method 300 for training a Machine Learning Network, MLN, for 3D reconstruction from satellite imagery is illustrated.

The method 300 comprises providing 301 at least one Machine Learning Network, MLN, able to predict depth maps.

The method 300 further comprising training 302 said MLN on a training set comprising at least one textured or non-textured geocoded 3D surface model for training purposes, wherein multi-view ground truth data is extracted or rendered from the textured or non-textured geocoded 3D surface model. Thus, ground truth data relating to a geographic area seen from at least two different views is rendered from the textured or non-textured geocoded 3D surface model. Note that even if the geocoded 3D surface model for training the MLN is textured, the trainer may choose to not use the texture information.

In an example, the MLN is optimized based on a gradient decent optimization algorithm. The gradient-based optimization algorithm may for example be a stochastic gradient descent optimizer or the Adam optimizer.

Figure 5:
FIG. 5 illustrates an example of 3D reconstruction from satellite imagery using deep learning.

FIG. 5 illustrates a 3D reconstruction from satellite imagery using deep learning. The 3D reconstruction comprises geocoded reference data and texture information on the lower right part of the 3D reconstruction and only geocoded non-textured reference data from depth map(s) on the upper left part.

There are a different ways of representing the 3D reconstruction from satellite imagery. The 3D reconstruction may for example be represented as a mesh, as a surface representation, or as a voxel representation or as a point cloud.

In the illustrated example, the 3D reconstruction is represented as a mesh. A processor is arranged to form the mesh based on the depth map(s) as predicted herein. In detail, the processor may be arranged to form the mesh by forming nodes interconnected by edges forming surfaces defined by the edges, wherein each node is associated to a three-dimensional geocoded reference data in a geographical coordinate system. Further, texture information provided from the satellite images or obtained from other source(s) may be associated to the surfaces of the mesh.

In FIG. 6, an example 3D reconstruction is formed as a mesh 600. The mesh 600 comprises a plurality of nodes 601 interconnected by means of edges 602. Surfaces 603 are provided boarded by the edges 602 of the mesh 600. The nodes 601 are each associated to a 3D coordinate in a geographical coordinate system. The surfaces 603 are in one example each associated to texture information. In one example, the surfaces are also each associated to 3D coordinate data in the geographical coordinate system. Further, a mesh uncertainty is associated to at least a subset of the nodes of the mesh. The mesh uncertainty associated to each respective node represents the uncertainty at that specific point of the model. In one example, the mesh uncertainty is associated to each node of the mesh. Determination of a mesh uncertainty is for example discussed in WO2014/112908.

Instead, or in addition thereto, at least a subset of the surfaces and/or edges can be associated to a mesh uncertainty. In one example, one mesh uncertainty is associated to each surface and/or edge. Alternatively, each surface and/or edge is associated to a plurality of mesh uncertainty values. For example, the mesh uncertainty values of the edges/surfaces are determined based on interpolation between neighbouring nodes.

In FIG. 7, the mesh uncertainty is illustrated. A value 700 for the mesh uncertainty is given in at least two directions. In the illustrated example, the mesh uncertainty value 700 is given in two dimensions. The uncertainty value in each direction is in one example represented as a distance or another value related to the distance. In one example, the uncertainty is represented as a value and possibly also direction in the plane of the surface and as a value in a direction perpendicular to the plane of the surface. In accordance with this example, each uncertainty is represented in relation to the associated local plane given by the surface of the mesh. When the uncertainty is given in space, the uncertainty defines an ellipsoid, the size and shape of which is given by the uncertainty value in each respective direction. In one example when the mesh uncertainty is given in three dimensions, it is represented as a 3×3 matrix. In one example when the mesh uncertainty is given in two dimensions, it is represented as a 2×2 matrix. The uncertainty may be represented as a probability.

FIG. 8 shows a system for 3D reconstruction from satellite imagery using deep learning, which system is implemented on a server 800. The server 800 comprises a first input 801 for 3D satellite images with associated camera parameters. The server also comprises a second input 802 for at least one MLN or a training set for training said at least one MLN.

The server 800 comprises a processor 803. A computer program runs on the processor 803, which makes the server 200 to perform the method(s) according to the invention. Thus, the processor 803 may be arranged to perform the training of the MLN(s) or be provided with the trained MLN(s). The processor may generate the 3D reconstruction from satellite imagery as described above.

The server 800 further comprises a memory 804. The memory may be arranged to store the generated 3D reconstruction and/or satellite imagery for 3D reconstruction, and or training data, and or at least one MLN.

The invention claimed is:

1. A method for 3D reconstruction from satellite imagery using deep learning, said method comprising the steps of:
   providing (101) at least two overlapping 2D satellite images,
   providing (102) imaging device parameters for the at least two overlapping 2D satellite images,
   providing (103) at least one trained Machine Learning Network, MLN, able to predict depth maps, said trained MLN being trained on a training set comprising multi-view 3D geocoded ground truth data, and
   predicting (104) a depth map of the at provided at least two 2D satellite images using the trained at least one MLN and based on the corresponding imaging device parameters,
   wherein the prediction of the depth map comprises predicting also an uncertainty map relating to the depth map.

2. The method according to claim 1, wherein the data of the training set has higher resolution that the at least two 2D satellite images.

3. The method according to claim 1, wherein the multi-view 3D geocoded ground truth data is real world data.

4. The method according to claim 1, wherein the multi-view 3D geocoded ground truth data is extracted from a geocoded 3D surface model for training purposes, said geocoded 3D surface model being provided based on real world data.

5. The method according to claim 1, wherein the multi-view 3D geocoded ground truth data comprises images and/or LIDAR measurement data and/or radar measurement data and/or sonar measurement data.

6. The method according to claim 1, wherein the overlapping 2D satellite images are bundle adjusted.

7. The method according to claim 1, wherein the training set relates to a built up environment.

8. The method according to claim 1, wherein the multi-view 3D geocoded ground truth data relates to a plurality of geographical areas and comprises a plurality of reference images and/or measurement data capturing each geographical area from different angles.

9. The method according to claim 1, wherein the ground truth data is geocoded.

10. The method according to claim 1, further comprising a step of training (99) the at least one MLN.

11. A non-transitory computer-readable medium for 3D reconstruction from satellite imagery using deep learning, comprising instructions which, when executed by at least one processor cause the at least one processor to carry out the method according to claim 1.

12. A method for 3D reconstruction from satellite imagery using deep learning, said method comprising the steps of:
   providing (101) at least two overlapping 2D satellite images,
   providing (102) imaging device parameters for the at least two overlapping 2D satellite images, providing (103) at least one trained Machine Learning Network, MLN, able to predict depth maps, said trained MLN being trained on a training set comprising multi-view 3D geocoded ground truth data, and predicting (104) a depth map of the at provided at least two 2D satellite images using the trained at least one MLN and based on the corresponding imaging device parameters, wherein the MLN comprises a plurality of MLNs each predicting a depth map and wherein an updated depth map is formed based on the predicted depth maps and when available based on the uncertainty map relating to the respective depth map.

13. The method according to claim 12, wherein one or more of:

the data of the training set has higher resolution that the at least two 2D satellite images, the multi-view 3D geocoded ground truth data is real world data, the multi-view 3D geocoded ground truth data is extracted from a geocoded 3D surface model for training purposes, said geocoded 3D surface model being provided based on real world data, the multi-view 3D geocoded ground truth data comprises images and/or LIDAR measurement data and/or radar measurement data and/or sonar measurement data, the overlapping 2D satellite images are bundle adjusted, the training set relates to a built up environment, the multi-view 3D geocoded ground truth data relates to a plurality of geographical areas and comprises a plurality of reference images and/or measurement data capturing each geographical area from different angles, or the ground truth data is geocoded.

14. A method for 3D reconstruction from satellite imagery using deep learning, said method comprising the steps of:

providing (101) at least two overlapping 2D satellite images, providing (102) imaging device parameters for the at least two overlapping 2D satellite images, providing (103) at least one trained Machine Learning Network, MLN, able to predict depth maps, said trained MLN being trained on a training set comprising multi-view 3D geocoded ground truth data, and predicting (104) a depth map of the at provided at least two 2D satellite images using the trained at least one MLN and based on the corresponding imaging device parameters, wherein the prediction of the depth map comprises associating the data of the depth map to geocoded coordinate data.

15. The method according to claim 14, wherein one or more of:

the data of the training set has higher resolution that the at least two 2D satellite images, the multi-view 3D geocoded ground truth data is real world data, the multi-view 3D geocoded ground truth data is extracted from a geocoded 3D surface model for training purposes, said geocoded 3D surface model being provided based on real world data, the multi-view 3D geocoded ground truth data comprises images and/or LIDAR measurement data and/or radar measurement data and/or sonar measurement data, the overlapping 2D satellite images are bundle adjusted, the training set relates to a built up environment, the multi-view 3D geocoded ground truth data relates to a plurality of geographical areas and comprises a plurality of reference images and/or measurement data capturing each geographical area from different angles, or the ground truth data is geocoded.

16. A method for 3D reconstruction from satellite imagery using deep learning, said method comprising the steps of:

providing (101) at least two overlapping 2D satellite images, providing (102) imaging device parameters for the at least two overlapping 2D satellite images, providing (103) at least one trained Machine Learning Network, MLN, able to predict depth maps, said trained MLN being trained on a training set comprising multi-view 3D geocoded ground truth data, predicting (104) a depth map of the at provided at least two 2D satellite images using the trained at least one MLN and based on the corresponding imaging device parameters, and generating (105) a geocoded 3D surface model based on the predicted depth map.

17. The method according to claim 16, wherein one or more of:

the data of the training set has higher resolution that the at least two 2D satellite images, the multi-view 3D geocoded ground truth data is real world data, the multi-view 3D geocoded ground truth data is extracted from a geocoded 3D surface model for training purposes, said geocoded 3D surface model being provided based on real world data, the multi-view 3D geocoded ground truth data comprises images and/or LIDAR measurement data and/or radar measurement data and/or sonar measurement data, the overlapping 2D satellite images are bundle adjusted, the training set relates to a built up environment, the multi-view 3D geocoded ground truth data relates to a plurality of geographical areas and comprises a plurality of reference images and/or measurement data capturing each geographical area from different angles, or the ground truth data is geocoded.

18. A method for 3D reconstruction from satellite imagery using deep learning, said method comprising the steps of:

providing (101) at least two overlapping 2D satellite images, providing (102) imaging device parameters for the at least two overlapping 2D satellite images, providing (103) at least one trained Machine Learning Network, MLN, able to predict depth maps, said trained MLN being trained on a training set comprising multi-view 3D geocoded ground truth data, and predicting (104) a depth map of the at provided at least two 2D satellite images using the trained at least one MLN and based on the corresponding imaging device parameters, wherein the trained MLN is arranged to predict depth maps for built-up environments.

19. The method according to claim 18, wherein one or more of:

the data of the training set has higher resolution that the at least two 2D satellite images, the multi-view 3D geocoded ground truth data is real world data, the multi-view 3D geocoded ground truth data is extracted from a geocoded 3D surface model for training purposes, said geocoded 3D surface model being provided based on real world data, the multi-view 3D geocoded ground truth data comprises images and/or LIDAR measurement data and/or radar measurement data and/or sonar measurement data, the overlapping 2D satellite images are bundle adjusted, the training set relates to a built up environment, the multi-view 3D geocoded ground truth data relates to a plurality of geographical areas and comprises a plurality of reference images and/or measurement data capturing each geographical area from different angles, or the ground truth data is geocoded.

20. A method (300) for training a Machine Learning Network, MLN, for 3D reconstruction from satellite imagery, said method comprising the steps of:

providing (301) at least one trained Machine Learning Network, MLN, able to predict depth maps, and training (302) said MLN on a training set comprising at least one textured or non-textured 3D geocoded 3D surface model for training purposes, wherein multi-view 3D geocoded ground truth data is rendered from said textured or non-textured geocoded 3D surface model for training purposes.

21. A non-transitory computer-readable medium for training a Machine Learning Network, MLN, for 3D reconstruction from satellite imagery, comprising instructions which, when executed by at least one processor cause the at least one processor to carry out the method according to claim 20.

* * * * *